(12) United States Patent
Fujita et al.

(10) Patent No.: US 7,314,359 B2
(45) Date of Patent: Jan. 1, 2008

(54) VANE PUMP FOR CONTINUOUSLY VARIABLE TRANSMISSION

(75) Inventors: Tomoyuki Fujita, Toyko (JP);
Masamichi Sugihara, Tokyo (JP);
Yoshinobu Yasue, Tokyo (JP);
Hiroyuki Nishiyama, Fuji (JP); Shingo Hirotsu, Fuji (JP); Katsutoshi Amano, Fuji (JP)

(73) Assignees: Kayaba Industry Co., Ltd., Tokyo (JP); Jatco Ltd., Shizuoka (JP)

( * ) Notice: Subject to any disclaimer, the term of this patent is extended or adjusted under 35 U.S.C. 154(b) by 30 days.

(21) Appl. No.: 11/253,819

(22) Filed: Oct. 20, 2005

(65) Prior Publication Data

US 2006/0088433 A1    Apr. 27, 2006

(30) Foreign Application Priority Data

Oct. 26, 2004   (JP) ............................. 2004-310723

(51) Int. Cl.
*F03C 4/00* (2006.01)
*F04C 18/00* (2006.01)

(52) U.S. Cl. .................... 418/259; 418/82; 418/98; 418/133; 418/268

(58) Field of Classification Search ................ 418/75, 418/76, 82, 87, 98, 133, 184, 259, 268, 269
See application file for complete search history.

(56) References Cited

U.S. PATENT DOCUMENTS 3,060,877 A * 10/1962 Ketterer .................... 184/6.15
3,361,076 A     1/1968  Davis
4,247,263 A *  1/1981  Pech et al. .................... 418/82

FOREIGN PATENT DOCUMENTS

| EP | 1 085 241 A2 | 3/2001 |
| EP | 1 182 350 A2 | 2/2002 |
| EP | 1 085 241 A3 | 1/2003 |
| JP | 52000695 3 U * | 1/1977 |
| JP | 08-291793 | 11/1996 |
| JP | 09042168 A * | 2/1997 |
| WO | WO 2004/018871 A1 | 3/2004 |

* cited by examiner

*Primary Examiner*—Theresa Trieu
(74) *Attorney, Agent, or Firm*—Rabin & Berdo, PC

(57) ABSTRACT

In a vane pump disposed inside a transmission case of a continuously variable transmission, a pump case (20), a pump drive shaft (8) rotatably supported by a shaft bore (9) of the pump case (20) to rotate a rotor (5), and a drain port (17), one end thereof being opened to a shaft bore (9) of the pump drive shaft (8) and the other end being opened to an outside of the pump case (20) are provided. A leaked oil flown via the drain port (17) from a pump discharge side is discharged to an outside of the pump case (20).

1 Claim, 2 Drawing Sheets

VANE PUMP FOR CONTINUOUSLY VARIABLE TRANSMISSION

BACKGROUND OF THE INVENTION

1. Field of the Invention

The present invention relates to a vane pump which is incorporated in a transmission case of a continuously variable transmission.

2. Description of Related Art

A continuously variable transmission (hereinafter referred to as CVT) has a transmission case equipped with a gear pump therein, and an operating oil supplied from the gear pump operates each part of the CVT. Since a pump efficiency of the gear pump, however, is not so good, use of a vane pump having better pump efficiency as compared to the gear pump has started to be reviewed. The vane pump is incorporated in the transmission case for use in the same way with a general gear pump, and an inside of the transmission case is filled with the operating oil. Accordingly, the vane pump is in a state to be submerged in the operating oil by more than the half thereof.

FIG. 2 shows a vane pump used under such a condition (refer to Japanese Patent Publication JP8-291793A).

The CVT includes a pump case 20 constructed of a body 1 and a cover 2. A cam ring 4 is incorporated in a body bore 3 formed in the body 1. A rotor 5 is disposed inside the cam ring 4. A plurality of vane grooves 6 are radially formed in the rotor 5, and a vane 7 is incorporated in each vane groove 6 in such a way to freely retract into or move out of the vane groove 6. A pump discharge pressure is introduced to a backpressure groove 6a as the bottom of the vane groove 6.

A drive shaft 8 is inserted in the pump case 20. The drive shaft 8 is rotatably supported by a bearing 9a in the body 1, as well as penetrates through the rotor 5 and is rotatably supported at the penetrating end by a bearing 10 disposed in the cover 2. The drive shaft 8 is arranged to be engaged to the rotor 5 via serration for rotation integral therewith.

Further, as an example, a base end of a drive shaft 8, i.e. an opposing side thereof to the side of the cover 2 extends into the transmission case (not shown). A driving mechanism is disposed in the transmission case and the drive shaft 8 is associated with the drive mechanism. The vane pump is, as described above, buried in the operating oil and therefore, a seal member 11 is not necessarily required, but may be disposed for sealing the circumference of the drive shaft 8.

Under the above structure, when the driving mechanism is rotated in the transmission case to rotate the drive shaft 8, the vanes 7 retract into or move out of the vane grooves 6, while rotating along an inner peripheral surface of the cam ring 4 together with the rotor 5. During this rotating process of the vanes 7, the chambers defined between the plurality of the vanes expand or contract to suck in or discharge the operating oil, i.e. provide a pumping action.

When the pumping action is provided as described above, the operating oil is drawn from a suction port 12 disposed in the body 1. The suction port 12 is arranged to have a suction opening positioned lower than the oil level in the transmission case and also oriented directly below. As a result, the operating oil in the transmission case is drawn directly from the suction port 12.

The operating oil drawn from the suction port 12 is drawn via a suction flow passage 13 formed in the side of the cover 2 into chambers defined by the vanes 7 during an expansion stroke and is then discharged from the same chambers during a contraction stroke. The high-pressure operating oil discharged from the chambers defined by the vanes 7 is introduced from a high-pressure chamber 14 via a passage (not shown) into a flow control valve 15.

The flow control valve 15 to which the high-pressure operating oil is introduced supplies a predetermined flow quantity thereof to a piston activating a pulley of the CVT (not shown) or a CVT drive mechanism such as a forward/backward changing apparatus and returns an excessive flow quantity of the operating oil exceeding the predetermined flow quantity back to the suction flow passage 13. The necessary flow quantity of the operating oil other than the excessive flow quantity is supplementary from the suction port 12.

In addition, the high-pressure operating oil discharged into the high-pressure chamber 14 is also introduced to the backpressure grooves 6a of the vane grooves 6 and with action of the high-pressure oil introduced to the backpressure grooves 6a, the vanes 7 are pushed out of the vane grooves 6 to contact the vanes 7 with the inner peripheral surface of the cam ring 4.

When the vane pump is driven to generate a high pressure in a discharge path side, the operating oil is leaked from a clearance between each member. The high-pressure operating oil discharge to the high-pressure chamber 14 is, for example, introduced into the flow control valve 15 via a passage (not shown), and during the communicating process, a leaked oil flows into a clearance between a shaft bore 9 of the body 1 and the drive shaft 8. The leaked oil flown between the shaft bore 9 and the drive shaft 8 is returned back to the side of the suction flow passage 13 via a drain passage 16. Accordingly, the leaked oil is arranged to be again drawn in the pump via the drain passage 16.

SUMMARY OF THE INVENTION

As described above, the conventional vane pump for the CVT is used in such a state as to be submerged in an operating oil inside the transmission case by more than the half thereof and provides a pumping action in use of the operating oil inside the transmission case. However, for example, a chain for driving-force transmission or the like moves inside the transmission case without any protection or cover, and therefore, the operating oil inside the transmission case is in such a state as to be always stirred. Accordingly, the operating oil inside the transmission case contains a lot of air bubbles.

For example, when an operation of the pump stops for a long time in the event of using the operating oil containing a lot of air bubbles, the air bubbles contained in the operating oil go up due to a difference in specific gravity between the air bubble and the operating oil. During the going-up process, air bubbles get together to form each of the air bubbles to be larger. And when the operation of the pump stops for a long time, the oil temperature resultantly goes down to increase oil viscosity of the operating oil.

As described above, when the pump starts with the state it has stopped for a long time, in the event the larger air bubbles exist inside the transmission case, they are difficult to go out. Since in particular, the leaked oil in the pump case 20 is recirculated to the side of the suction flow passage 13 inside the pump case 20 via the drain passage 16, almost all of the air bubbles contained in the leaked oil remain inside the pump case 20.

As the air bubbles thus remaining in the pump case 20 enter into the backpressure grooves 6a, the air bubbles prevent generation of force to push up the vanes 7. If the force to push up the vanes 7 is not generated, the vanes 7 do not contact with the inner peripheral surface of the cam ring

4. Since in particular, in the conventional vane pump, the suction opening of the suction port 12 positioned lower than the oil level of the pump case 20 is oriented directly below, almost all of the air bubbles do not go out from the suction opening.

In addition, since rotation of the rotor 5 at the pump starting time causes centrifugal force to act on the vanes 7, the centrifugal force acts on the vanes 7 as force to move them out of the vane grooves 6. However, as described above, when the pump stops for a long time, the oil temperature goes down to increase the viscosity of the operating oil. As the viscosity of the operating oil gets the higher, the vanes 7 are the more difficult to go out from the vane grooves 6. Therefore, the vanes 7 can not go out from the vane grooves 6 only with the centrifugal force and as a result, the vanes 7 do not get in contact with the inner peripheral surface of the cam ring 4.

In this way, when the air bubbles are entered into the backpressure grooves 6a or the viscosity of the operating oil is high at a low oil temperature, even if the rotor 5 rotates, in the event the vanes 7 do not get in contact with the inner peripheral surface of the cam ring 4 easily, the vane pump can not perform the pumping action sufficiently. As a result, there is a problem with taking the more time to discharge the operating oil for activating the CVT.

When the vane pump, however, continues to operate for a little while, the temperature of the operating oil increases to reduce the viscosity thereof correspondingly. Finally the vanes 7 are projected from the vane grooves 6 due to centrifugal action of the rotor 5. When the pump continues to operate, the operating oil is sufficiently stirred to produce the smaller air bubbles in size, which are dispersed. When the air bubbles become smaller and dispersed, even if the air bubbles enter into the backpressure grooves 6a, they do not affect the pumping action so much.

In view of the above, there exists a need for a vane pump for a CVT which overcomes the above-mentioned problems in the related art. The present invention addresses this need in the related art as well as other needs, which will become apparent to those skilled in the art from this disclosure.

It is an object of the present invention to provide a vane pump for a CVT, which can sufficiently discharge an operating oil immediately after pump starting.

In order to achieve above object the invention provides A vane pump disposed inside a transmission case of a continuously variable transmission. The vane pump comprises a pump case, a pump drive shaft rotatably supported by a shaft bore of the pump case to rotate a rotor, and a drain port, one end thereof being opened to the shaft bore of the pump drive shaft and the other end being opened to an outside of the pump case, wherein a leaked oil flown via the drain port from a pump discharge side is discharged to the outside of the pump case.

These and other objects, features, aspects and advantages of the present invention will be become apparent to those skilled in the art from the following detailed description, which, taken in conjunction with the annexed drawings, discloses a preferred embodiment of the present invention.

BRIEF DESCRIPTION OF THE DRAWINGS

A preferred embodiment according to the invention will be explained below referring to the drawings, wherein.

DETAILED DESCRIPTION OF PREFERRED EMBODIMENT

Figure 1:
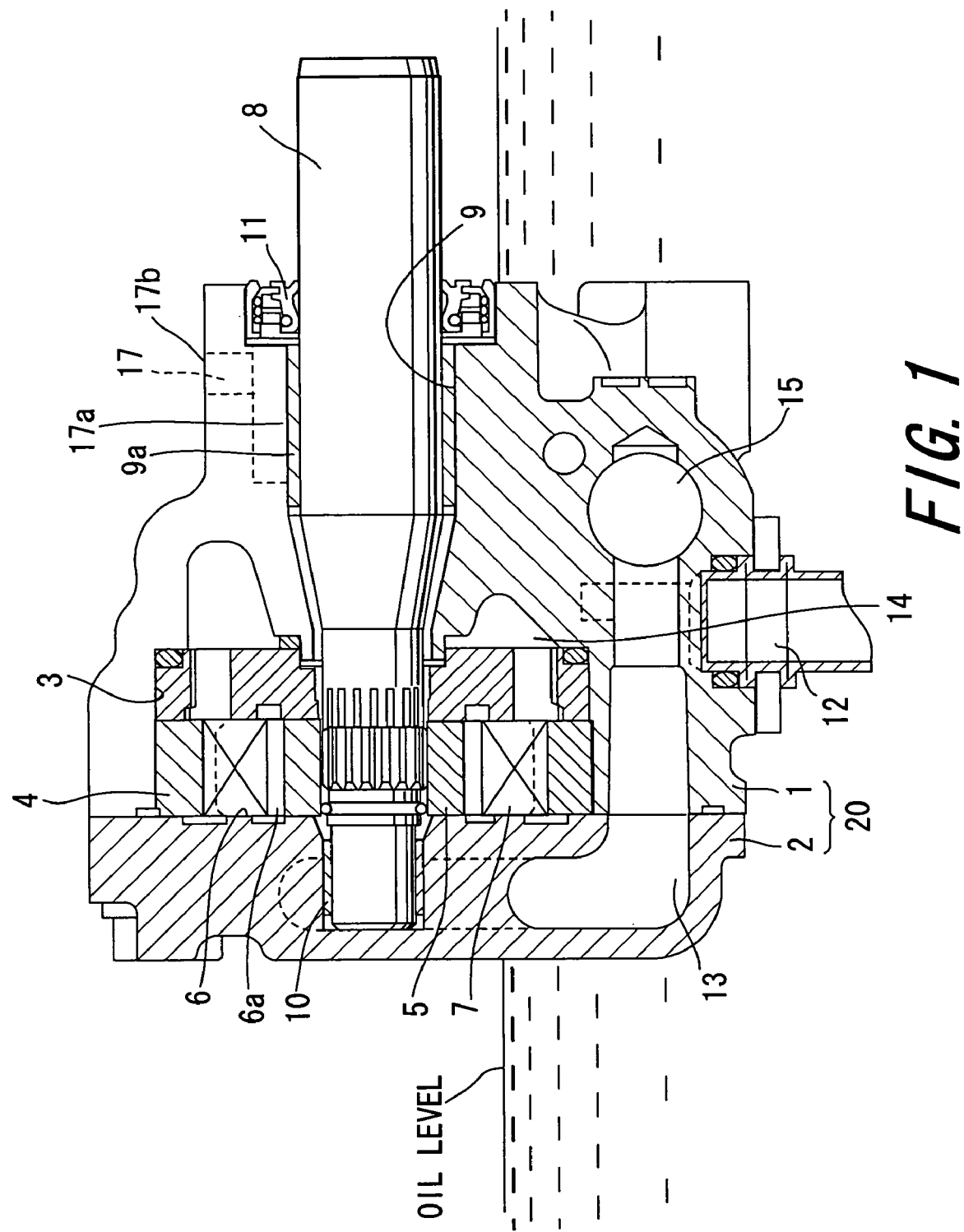
FIG. 1 is a cross-sectional view showing a vane pump for a CVT in a preferred embodiment of the present invention.
Figure 2:
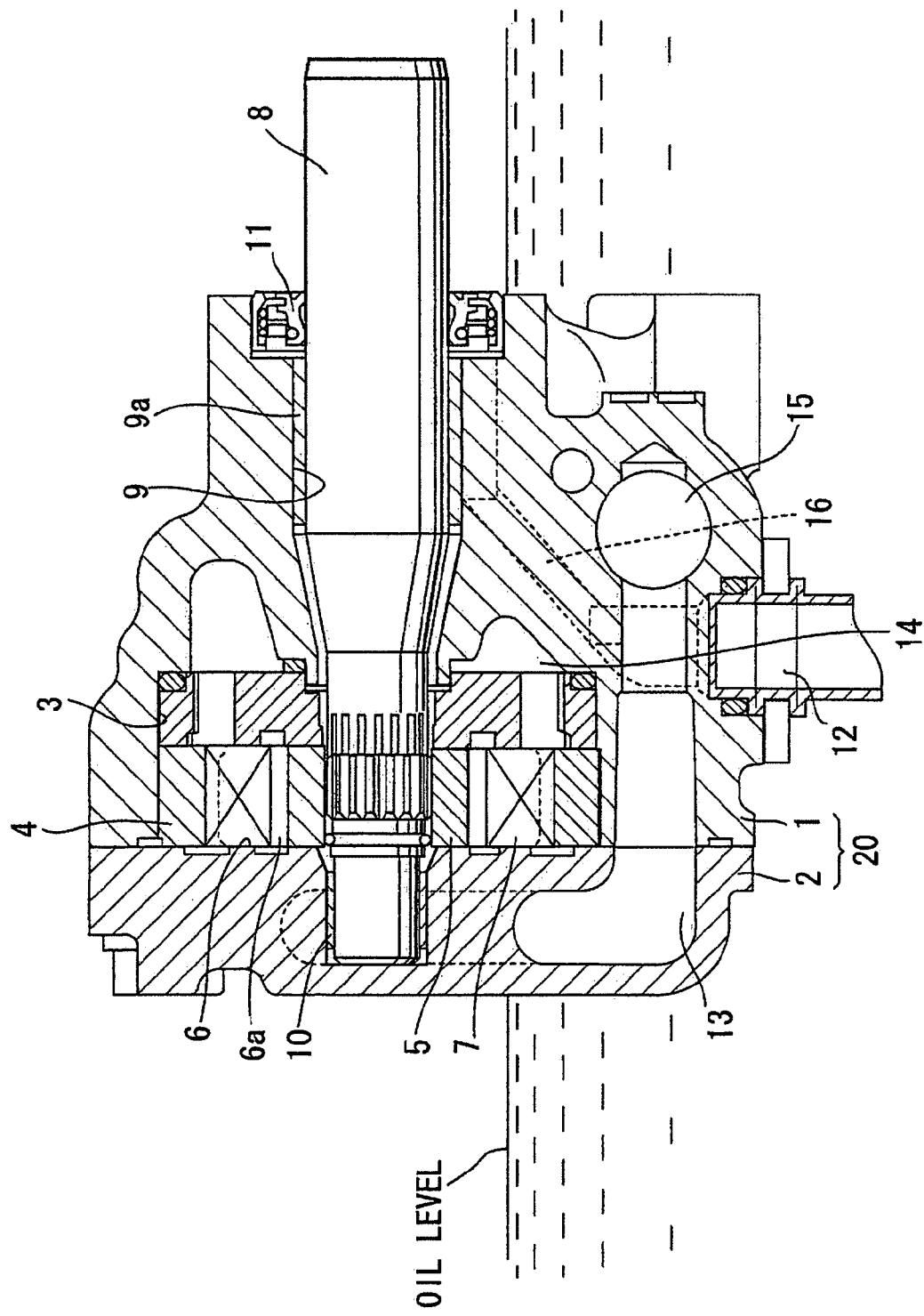
FIG. 2 is a cross-sectional view showing a conventional vane pump for a power steering.

FIG. 1 is a vane pump for a CVT in a preferred embodiment of the present invention in which components identical to those in the conventional example in FIG. 2 are referred to as identical numerals.

A vane pump for a continuously variable transmission (referred to as CVT) of the preferred embodiment supplies an operating oil to a cylinder receiving a piston therein for moving a primary pulley or a secondary pulley of the CVT and a CVT drive mechanism including a forward/backward changing apparatus or the like and is disposed inside a transmission case of the CVT and is submerged in the operating oil in the transmission case by at least a part of the vane pump.

The CVT includes a pump case 20 constructed of a body 1 and a cover 2. A cam ring 4 is incorporated in a body bore 3 formed in the body 1. A rotor 5 is disposed inside the cam ring 4. A plurality of vane grooves 6 are radially formed in the rotor 5, and a vane 7 is incorporated in each vane groove 6 in such a way to freely retract into or move out of the vane groove 6. A bottom of the vane groove 6 is defined as a backpressure groove 6a.

A drive shaft 8 is inserted in the pump case 20. The drive shaft 8 is rotatably supported by a bearing 9a engaged to a shaft bore 9 in the body 1, as well as penetrates through the rotor 5 and is rotatably supported at the penetrating end by a bearing 10 disposed in the cover 2. The drive shaft 8 is arranged to be engaged to the rotor 5 via serration for rotation integral therewith.

A base end of a drive shaft 8, i.e. an opposing side thereof to the side of the cover 2 extends from the pump case 20 and is positioned in the transmission case (not shown). A driving mechanism including a gear mechanism or the like is disposed in the transmission case and the drive shaft 8 is associated with the drive mechanism. A seal member 11 is not necessarily required similarly to the conventional vane pump, but is disposed for sealing an end of the drive shaft 8.

When the drive shaft 8 is rotated by the driving mechanism disposed in the transmission case, the vanes 7 retract into or move out of the vane grooves 6 and rotate along an inner peripheral surface of the cam ring 4 together with the rotor 5. During this rotating process of the vanes 7, a chamber defined between a pair of the vanes 7 expands or contracts to suck in or discharge the operating oil, i.e. provides a pumping action.

With this pumping action, the operating oil is drawn from a suction port 12 disposed in the body 1. The suction port 12 is arranged to have a suction opening positioned lower than the oil level in the transmission case and also oriented directly below. As a result, the operating oil in the transmission case is drawn directly from the suction port 12 thus formed.

The operating oil drawn from the suction port 12 is drawn via a suction flow passage 13 formed in the side of the cover 2 into chambers defined by the vanes 7 during an expansion stroke and is then discharged from the same chambers during a contraction stroke. The high-pressure operating oil discharged from the chambers defined between the vanes 7 is introduced from a high-pressure chamber 14 via a passage (not shown) into a flow control valve 15.

The flow control valve 15 to which the high-pressure operating oil is introduced supplies a predetermined flow quantity thereof to a piston activating a pulley of the CVT (not shown) or a CVT drive mechanism such as a forward/backward changing apparatus and returns an excessive flow quantity of the operating oil exceeding the predetermined flow quantity back to the suction flow passage 13. Accordingly, the necessary flow quantity of the operating oil other than the excessive flow quantity is supplementary from the suction port 12.

A part of the high-pressure operating oil discharged into the high-pressure chamber 14 is also introduced to the backpressure grooves 6a of the vane grooves 6 and with action of the high-pressure oil introduced to the backpressure grooves 6a, the vanes 7 are pushed out of the vane grooves 6 to contact top ends of the vanes 7 with the inner peripheral surface of the cam ring 4.

When the vane pump is driven to generate a high pressure in a discharge path side, the operating oil is leaked from a clearance between each member similarly to the conventional vane pump. The high-pressure operating oil discharged to the high-pressure chamber 14 is, for example, introduced into flow control valve 15 via a passage (not shown), and during the communicating process, a leaked oil flows into a clearance between a shaft bore 9 of the body 1 and the drive shaft 8.

A drain port 17 is provided in the body 1 to discharge the leaked oil to an outside. One end 17a of the drain port 17 is connected to the circumference of the shaft bore 9 of the drive shaft 8 and the other end 17b thereof is opened to an outside at the upper side of the body 1.

The drain port 17 is positioned at an opposite side to the suction port 12, having the drive shaft 8 placed therebetween. One end (opening) 17a of the drain port 17 opened to the shaft bore 9 is positioned above the drive shaft 8 and the other end (opening) 17b of the drain port 17 is opened to an upper surface of the pump case 20, providing such a relationship that the opening 17b is positioned at a side higher than the oil level in the transmission case. In addition, the drain port 17 is arranged to form a flow passage that elevates continuously from one end 17a opened to the shaft bore 9 to the other end 17b opened to the outside of the pump case 20, so that the leaked oil containing the air bubbles is not trapped in the mid course and discharged to the outside of the pump case 20.

Opening the drain port 17 to an inside of the transmission case allows the leaked oil from the discharge side to be positively released to the outside of the pump case 20, i.e. the inside of the transmission case. Since the leaked oil is thus released positively, the air bubbles contained in the leaked oil are less likely to remain inside the pump case 20. Further, even if the vane pump stops for a long time, thereby to largely expand the air bubbles in size, since the drain port 17 acts as a continuously elevating flow passage, release of the air bubbles is certainly performed.

This construction thus prevents the state where, for example, at the pump starting time, the air bubbles remain in the backpressure grooves 6a of the vane pump so that the vanes 7 are difficult to move out of the vane grooves 6. As a result, discharge delay in time from a point when the vane pump starts to rotate to a point when the vane pump starts to discharge the operating oil is prevented, thus securely activating the CVT from an initial time of the vane pump starting without delay.

Yet, according to the preferred embodiment, since the drain port 17 is opened to the upper surface of the pump case 20 and the opening is positioned above the oil level in the transmission case. Therefore, the air bubble lighter in specific gravity than the operating oil passes through the drain port 17 and is released above the oil level.

Note that if the rotor 5 rotates swiftly at the pump starting time, the vanes 7 are projected out of the vane grooves 6 due to centrifugal force in any way. Accordingly, even if all the vanes 7 are not in contact with the inner peripheral surface of the cam ring 4, flow of the operating oil is generated in the pump case 20. This flow of the operating oil thus produces the leaked oil, which is discharged from the drain port 17 to the outside of the pump case 20 together with the air bubbles.

A plurality of drain ports may be naturally disposed. In the preferred embodiment, as shown in FIG. 1, the drain port 17 is opened to a side as opposed to the suction port 12, but may be opened to any direction only if opened to an inside of the transmission case at an outward of the pump case 20.

This application claims priority to Japanese Patent Application No. 2004-310723. The entire disclosure of Japanese Patent Application No. 2004-310723 is hereby incorporated herein by reference.

While only the selected preferred embodiment has been chosen to illustrate the present invention, it will be apparent to those skilled in the art from this disclosure that various changes and modifications can be made therein without departing from the scope of the invention as defined in the appended claims. Furthermore, the foregoing description of the preferred embodiment according to the present invention is provided for illustration only, and not for the purpose of limiting the invention as defined by the appended claims and their equivalents.

What is claimed is:

1. A vane pump disposed inside a transmission case of a continuously variable transmission, comprising:
   a pump case;
   a pump drive shaft rotatably supported by a shaft bore of the pump case to rotate a rotor;
   a suction port drawing oil from the transmission case; and
   a drain port, one end thereof being opened to the shaft bore of the pump drive shaft and the other end being opened to an outside of the pump case, wherein:
   a leaked oil flown via the drain port from a pump discharge side is discharged to the outside of the pump case;
   the suction port is arranged to have a suction opening positioned lower than an oil level in the transmission case; and
   the drain port is so formed that an opening thereof to the outside of the pump case is disposed at a higher position than an opening thereof to the shaft bore, the opening to the outside of the pump case is disposed at a position higher than the oil level in the transmission case, and the drain port is formed to continuously elevate from the opening to the shaft bore to the opening to the outside of the pump case at the position higher than the oil level in the transmission case.

* * * * *